May 19, 1931.  C. H. WHITE  1,805,505
PLANTER MARKER
Filed July 30, 1927
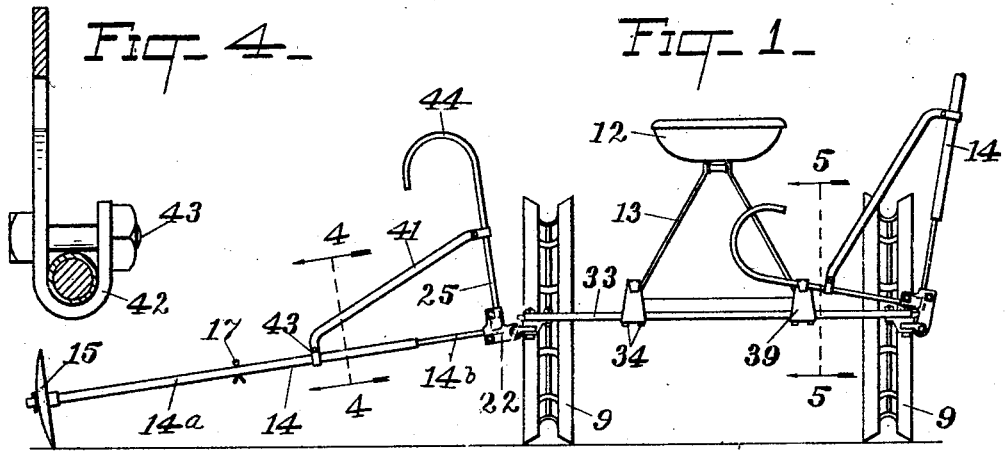
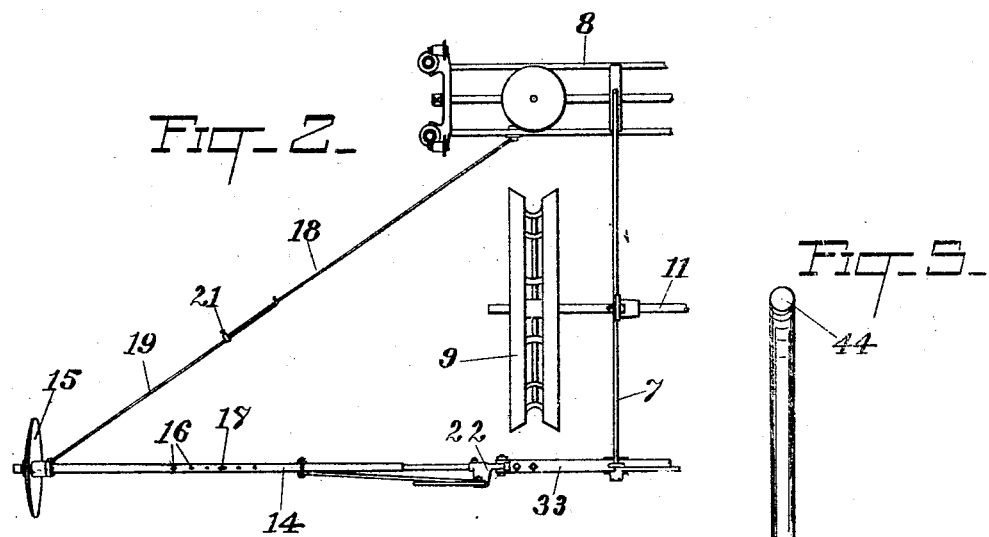
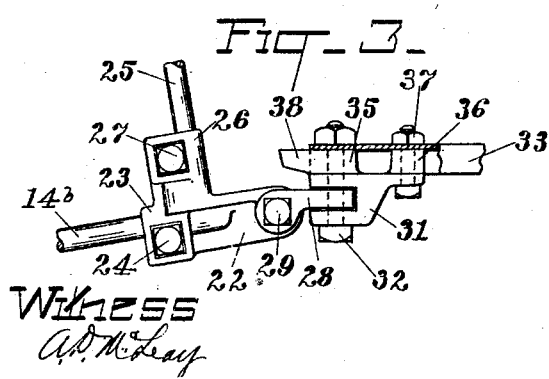
Inventor
Charles H. White
by John L. Justin
Attorney
Witness
A. D. McLeay Patented May 19, 1931

1,805,505

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

PLANTER MARKER

Application filed July 30, 1927. Serial No. 209,513.

This invention relates to markers for planting implements, such marking devices being commonly employed for cutting a shallow trench or guide line in the soil at one side of the implement in order to guide the next course of travel of the implement across the field, and thereby secure a uniform spacing of the planting rows.

It is customary to provide two of such marking devices, one at each side of the implement, adapted to be swung alternately between an upper inoperative position, and a lower operative position in engagement with the soil, as the implement travels in opposite directions across the field. My invention pertains to marking devices of this type which are moved manually into and out of their operative positions, such manual operation being preferable when employing certain types of furrow openers at the outer ends of the marker arms. When these marking devices are arranged for manual actuation, it is desirable that their operation be made as convenient as possible.

The object of the present invention is to provide an improved construction of handle means for these markers, characterized by the fact that some portion of the handle of each marker is always within convenient reach of the operator, irrespective of whether the marker is in its raised or lowered position. Thus the operation of raising one marker and lowering the other each time that the implement is turned around at the end of the field can be quickly and easily performed by the operator without requiring that he leave his seat or reach to an awkward position for the handles. More specifically, this is accomplished by so constructing the handles that successive portions thereof are presented within convenient reach of the operator as the markers are swung between their operative and inoperative positions.

Other objects and advantages of the invention will appear at length in the following detailed description of the preferred embodiment thereof. In the drawings accompanying such description:

Figure 1 is a rear elevational view of a conventional type of planter showing the present markers mounted thereon.

Figure 2 is a fragmentary plan view of one side of the implement, showing the marker on this side of the implement swung down to its operative position.

Figure 3 is a detailed view, showing the construction of the pivot block which connects the marker arm to the implement.

Figure 4 is a transverse sectional view through the marker arm, taken on the plane of the line 4—4 of Figure 1, and, Figure 5 is a transverse sectional view taken on the plane of the line 5—5 of Figure 1, and showing one of the detent hooks.

Figures 1 and 2 illustrate fragmentarily a conventional planter of the type to which these marking devices have particular application. Such planter comprises the usual back frame 7, transversely extending front frame 8, and supporting wheels 9. The latter are journaled on an axle 11, secured to the back frame 7. The operator's seat 12 is usually mounted over the back frame 7 on supporting bars 13. I have not illustrated the furrow openers, the seed feeding apparatus, or any of the other mechanisms which enter into the planting operation, as such mechanisms form no part of the present invention.

Pivotally supported on each side of the implement are marker arms 14—14, on the outer ends of which are supported the soil-engaging or marking elements 15 which open the shallow trenches or furrows constituting the guide lines above referred to. In the present construction I have shown these soil engaging elements 15 as consisting of discs rotatably supported on the outer ends of arms 14 and properly angled for opening the guide furrows.

Each marker arm 14 is adjustable in length so as to enable the device to be adjusted for securing any desired spacing between the rows. To this end, each arm consists of an outer pipe section 14a which slides telescopically over an inner bar 14b. Preferably, the pipe section 14a constitutes the outer end of the arm and the rod 14b the inner end, although this relation might be reversed, if desired. The tubular section 14a has a plurality of spaced holes 16 extending therethrough for receiving a cotter pin 17 which also extends through a hole in the inner rod section 14b, thereby locking the two sections together in any desired linear adjustment. The draft pull of the marker element 15 is sustained by a suitable tension connection, preferably consisting of two light rods 18—19 which extend between the outer end of the marker arm and the front frame 8. The front rod 18 has pivotal connection with the frame 8 to permit an upward swinging movement of the marker arm as illustrated at the right side of Figure 1. The two rods have an adjustable connection 21 which accommodates different length adjustments of the marker arm 14.

The construction of the pivotal connection and of the operating handle is duplicated for each marker at the opposite sides of the machine, and hence a description of one of these markers will suffice for both. The inner end of the marker arm has universal pivotal connection with the implement through a pivot block 22. As shown in Figure 3, the inner rod section 14b of the marker arm enters a tubular socket 23 formed in the outer end of the pivot block 22, in which socket the rod is clamped by a suitable clamping bolt 24. The rod 25 which constitutes the operating handle for the marker enters a similar socket 26, extending at right angles to the socket 23. The rod 25 is clamped in the latter socket by a suitable clamping bolt 27.

The inner end of the pivot block 22 extends into the forked end of a pivot link 28 where it receives a pivot bolt 29 passing through the side arms of the link 28 and through an aperture in the pivot block. The vertical swinging movement of the marker arm between its raised and lowered positions, represented at the right hand side of Figure 1, occurs around the axis of this pivot bolt 29. The other end of the link 28 extends between the upper and lower arms of a clevis shaped bracket 31 which is rigidly secured to the implement. A bolt 32 which extends down through the two arms of the bracket 31 passes loosely through a hole in the inner end of the link 28, thereby providing a vertical pivotal axis around which the marker arm can have fore-and-aft swinging movement. This ability of the marker arm to swing fore and aft is desirable, as, for instance, to prevent breakage of the parts when the implement is moved backwardly. The bracket 31 may be secured directly to the usual frame structure of the implement, but I find it preferable to attach the bracket to a special mounting bar 33 which is secured to the rear end of the back frame 7. The bar 33 is fixedly secured to the back frame at points spaced inwardly from the ends of the bar, the bolts 34 in Figure 1 representing such points of attachment. Such arrangement leaves the outer ends of bar 33 free to flex slightly for a purpose which I shall presently describe. The bar 33 is preferably an inverted channel and each mounting bracket 31 comprises two lug-portions 35—36 which extend up into the channel. The pivot bolt 32 extends through the lug 35 and a second fastening bolt 37 extends through the other lug 36, both bolts passing up through the web of the channel. Extending outwardly from the lug 35 is a stop projection 38 which is adapted to be engaged by the upper or inner surface of the pivot block 22 as the marker arm is swung upwardly, such stop projection limiting this upward swinging movement of the arm to substantially the position shown at the right hand side of Figure 1. The marker arm is held in such raised position by springing the handle rod 25 down under a hookshaped detent 39. One of such detents is provided for each marker arm, each detent being constructed as shown in Figure 5 and being secured to the cross bar 33 substantially at the points where such bar is secured to the back frame 7. The projecting ends of the cross bar 33 have a certain amount of flexibility, as have also the handle rods 25, and the stop projections 38 are proportioned to strike the pivot blocks 22 before the handle rods are in a position to engage under the hooks 39, thereby compelling the handle rods to be sprung downwardly for engaging under these hooks. Such construction serves to hold the marker arms in their raised positions with a resilient spring pressure, thereby preventing the possibility of the arms being released by the jolting of the machine and of falling downward to their lower positions.

Extending between each handle rod and its marker arm is a diagonal brace 41. As shown in Figure 4, the ends of such brace are looped as indicated at 42 to engage around the sleeve portion 14a of the marker arm and around the handle rod 25 respectively. Clamping bolts 43 pass through such looped ends, rigidly binding the brace to the arm and to the handle rod. The brace reinforces the handle rod 25, and it will also be observed that by virtue of its clamped engagement over the outer tubular section 14a of the marker arm, such brace acts as a spacing member between the tubular section and the handle rod 25, and hence assists the cotter pin 17 in holding the two telescopic arm section in their desired length adjustment.

It will be noted that the upper end of each handle rod 25 is curved outwardly as indicated at 44, substantially in the plane of the marker arm. This half-loop or U-shaped curvature affords a multiplicity of hand-holds which are presented successively for convenient grasping by the operator as the marker is swung between its upper and lower positions. That is to say, when the marker is in its lower operative position, as shown at the left hand side of Figure 1, the straight shank portion and the adjacent side of the curved end 44 are disposed within convenient reach of the operator. As the marker arm is swung upwardly, the operator will slip his hand along the curved portion 44 until the marker arm reaches its completely raised position, when the operator will be grasping the extremity of the curved portion 44. This extremity of the curved portion forms another hand-hold within convenient reach of the operator from his position on the seat 12, so that he can spring the handle rod down under the detent hook 39 without having to leave his seat or reach to an awkward position. Similarly, when it is desired to release one of the marker arms for swinging the same downwardly to its outward position, the extremity of the curved handle portion 44 is within convenient reach of the operator's position on the seat 12, so that he can easily and conveniently exert the required downward pressure on the handle to release the same from the detent hook. It will thus be seen that the foregoing construction of handle affords different handle portions which are presented successively within convenient reach of the operator as the marker is moved between its operative and inoperative positions.

Having thus described my invention what I claim as new and desire to secure by Letters Patent of the United States, is:

1. In a planting implement, the combination of a marker pivotally mounted on the implement for swinging movement into and out of operative position, and handle means for swinging said marker comprising laterally spaced handle portions which are presented successively within convenient reach of the operator as the marker is moved between its operative and inoperative positions.

2. In a planting implement, the combination of a frame, a marker arm pivotally supported on said frame for vertically swinging movement, a marker element on the outer end of said arm, and a rod projecting at an angle from said arm and having its swinging end curved outwardly toward said marker element to provide an outwardly extending U-shaped handle portion.

3. In a planting implement, the combination of a frame, a marker arm pivotally mounted on said frame for vertically swinging movement, a marker element at the outer end of said arm, a rod secured at its lower end to said arm and projecting therefrom at an angle, and a U-shaped handle at the upper end of said rod.

4. In a planting implement, the combination of a frame, a marker arm, a pivot block having a socket therein for receiving the inner end of said marker arm, means for securing the said marker arm in said socket, said pivot block comprising a second socket extending at an angle to said first named socket, a handle rod mounted in said second socket, means for clamping said rod therein, and a connecting link establishing a universal pivotal connection between said pivot block and said frame.

5. In a planting implement, the combination of a frame, a marker arm pivotally supported on said frame for vertically swinging movement, a marker element on the outer end of said arm, an operating handle secured to said arm for swinging the latter, a detent shoulder on said frame under which the said operating handle is adapted to be engaged when said marker arm is raised to its inoperative position, and stop means for limiting the upward swinging movement of said arm, said stop means becoming effective before said operating handle comes into engagement with said detent shoulder, whereby said operating handle must be sprung down under said detent shoulder.

6. In a planter having an operator's seat, a frame and a marker arm pivotally secured to the frame, the combination of an operating handle for raising and lowering said arm, secured to the marker arm, the outer end of the said handle being arcuate and so formed that a portion of the same is always adjacent the operator's seat, whereby the operating handle may be conveniently reached for both raising and lowering said marker arm.

7. In a planting implement having an operator's station thereon, the combination of a marker pivotally mounted on the implement for swinging movement into and out of operative position, and handle means for swinging said marker, said handle means including structure providing a plurality of hand-hold portions adapted to be grasped by the hand of the operator and constructed so as to place one hand-hold portion within convenient reach of the operator when the marker is in its lowered position, and to present another hand-hold portion within convenient reach of the operator when the marker is swung up to its raised position.

CHARLES H. WHITE.